UNITED STATES PATENT OFFICE 2,585,593

METHOD FOR PREPARING CHLORINE DIOXIDE GAS

Johan Waldemar Sevón and Frey Viking Sundman, Kuusankoski, Finland; Karl-Gustaf Birger Fogelholm, administrator of the estate of said Johan Waldemar Sevón, deceased, assignors to Kymin Osakeyhtio-Kymmene Aktiebolag, Kuusankoski, Kymi, Finland, a company of Finland No Drawing. Application May 16, 1946, Serial No. 670,318. In Finland January 12, 1946

6 Claims. (Cl. 23—152)

Chlorine dioxide gas containing chlorine may be prepared by the known method of treating solutions of chlorates with solutions of hydrochloric acid. The disadvantage in this method lies in the fact that the speed of reaction for the formation of chlorine dioxide and the yield of chlorine dioxide are strongly dependent on the chlorate concentration of the solution. For this reason, the actual yield of chlorine dioxide falls far behind the theoretical yield calculated from the quantity of chlorate put into the reaction, nor is it possible to utilize all of the chlorate present in the reaction mixture within a reasonable time limit. Moreover, the strongly acid chloride-hydrochloric acid solution still containing chlorates left over after the reaction is completed is difficult to utilize economically for the production of useful products and is an unpleasant burden on the process. A further disadvantage of the process mentioned is the fact that the course of the reaction is anything but stoichiometric, so that as much as twice the theoretically necessary amount of hydrochloric acid must be used.

The reaction between chlorate and hydrogen chloride to form chlorine dioxide takes place according to the following equation:

I. 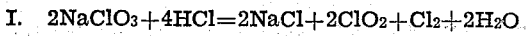 $2NaClO_3 + 4HCl = 2NaCl + 2ClO_2 + Cl_2 + 2H_2O$

This reaction is accompanied by another, in which the chlorate is completely reduced to chloride with formation of chlorine:

II.  $2NaClO_3 + 12HCl = 2NaCl + 6Cl_2 + 6H_2O$

Reaction I, which gives the largest possible yield of chlorine dioxide, prevails chiefly at high chlorate concentrations in the presence of not too great an excess of hydrogen chloride, as also at low temperatures. The more the chlorate concentration of the solution decreases in the course of the reaction, partly through consumption of chlorate in the reaction and partly through dilution with the water of reaction, the more reaction I is replaced by reaction II. Since, moreover, the speed of the reaction decreases appreciably as the chlorate concentration falls off, it becomes necessary to raise the reaction temperature in order to complete the reaction within a reasonable time limit, which in turn also contributes to a shift in the equilibrium in favor of reaction II. As the chlorate decreases and the amount of hydrochloric acid in the solution increases reaction II is further favored.

The invention here presented proposes a method for preparing chlorine dioxide by reaction between chlorates and hydrogen chloride in which the disadvantages mentioned above are eliminated.

The principle of the process proposed consists in treating solid chlorates or mixtures of salts containing chlorates with hydrogen chloride or mixtures of gases containing gaseous hydrogen chloride in the presence of moisture, care being taken to substantially maintain the solid consistency of the salt mixture during the entire process.

The method proposed in this invention is based on the observation that solid chlorates react to practically 100% with gaseous hydrogen chloride according to reaction I in the presence of even exceedingly small amounts of moisture. As may be seen from the equation presented, a considerable amount of water is formed in the reaction, which gives the salt mixture a more and more pasty consistency as the reaction proceeds and causes the equilibrium to shift more and more in favor of reaction II. In the course of reaction II, however, even more water is formed, causing a decrease in the yield of chlorine dioxide and increased consumption of chemicals.

According to this invention the water formed by the reaction is therefore bound as by the aid of water-binding solid, liquid, or gaseous substances or combinations of the same. As such water-binding substances we may employ substances capable of combining chemically with water, such as, for example, anhydrocompounds or salts able to bind water of crystallization, such for example as anhydrous sodium sulfate or calcined gypsum. These substances may be added either at the beginning of the process or during any stage of it. Also, the addition of, for example, a gaseous water-binding substance may take place together with the addition of hydrogen chloride and be during the whole process regulated according to requirements. It is expedient to employ for the binding of water substances also able to reduce the chlorine formed in the reaction, by which means a chlorine dioxide less contaminated with chlorine may be obtained and the amount of hydrogen chloride gas required for the reaction is reduced.

As an example of how this process may be carried out we propose the use of sulfur dioxide as a means both of binding water and of reducing chlorine.

Added in suitable amounts to a mixture of chlorine and chlorine dioxide, sulfur dioxide reacts only with the former, according to the equation:

III. 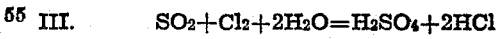 $SO_2 + Cl_2 + 2H_2O = H_2SO_4 + 2HCl$

It is therefore possible to bind by this reaction the water formed in reaction I. The mixture of acids formed is quickly absorbed by the moist salts and reacts anew according to Equation I. The amount of sulfur dioxide added need not correspond to the amount of chlorine formed in the reaction, but is rather regulated so that the salts-mixture in the reaction chamber maintains its solid consistency.

For the practical application of the process any known and suitable apparatus may be employed. The reaction vessel may be equipped with a mechanical stirrer for the salt. It may have the shape of a rotating drum equipped with baffles or a winged screw, or it can even consist of a simple vessel (for example a tower) without any mechanical stirring arrangements. In this latter case it is expedient to give the chlorate a coarse-grained form by some known method in order to facilitate the passage of the gases through the salts layer. It is furthermore expedient to carry out the reaction in two or more separate reaction vessels placed in series, it being possible by means of suitable couplings to couple in each reaction vessel at any place in the series. In such an arrangement a newly recharged reaction vessel is always coupled last in the series. The advantage of such a procedure is that losses of hydrogen chloride may be avoided even with complete utilization of the chlorate.

The process disclosed in this invention may also be carried out continuously.

The hydrogen chloride gas used in the process may be produced in any known manner; an expedient method for obtaining it is the thermo-reaction of hydrogen and chlorine obtained from the electrolysis of alkali chlorides. The chlorine-containing residual gases resulting from the compression of chlorine in connection with the electrolysis of alkali chlorides are also a suitable material for production of the hydrogen chloride. The source of hydrogen may in this case be, for example, generator gas, water-gas, or the like.

It is expedient to dilute the hydrogen chloride gas with indifferent gases, since chlorine dioxide is explosive in higher concentrations. The reaction temperature should be kept low by cooling; it should best be kept between 20°–30° C.

Outside of sodium chlorate, any other chlorates whatever may, of course, be used in this process. Even raw chlorates contaminated with chlorides may possibly be used.

As compared to the previously known hydrochloric acid process the process disclosed in this invention has the advantages of simple and compact apparatus necessary and a high yield of chlorine dioxide (98–99%). The speed of the reaction is high and is dependent only on the feed rapidity of hydrogen chloride and the effectivity of the cooling system. The chlorate is entirely consumed. The residual salts in the reaction vessel are solid and easy to transform into useful products, depending on what chlorates were employed.

What is claimed is:

1. Process of producing chlorine dioxide comprising reacting a solid chlorate salt moistened with insufficient water to dissolve the same with a gaseous mixture of sulfur dioxide and hydrogen chloride whereby moisture formed in the reaction is continuously removed and a solution of the solid chlorate salt inhibited.

2. Process of producing chlorine dioxide comprising reacting solid sodium chlorate moistened with insufficient water to dissolve the same with a gaseous mixture of sulfur dioxide and hydrogen chloride whereby moisture formed in the reaction is continuously removed and a solution of the solid chlorate salt inhibited.

3. Process of producing chlorine dioxide comprising reacting a solid chlorate salt moistened with insufficient water to dissolve the same with a dry gaseous mixture comprising hydrogen chloride, said reacting solid chlorate salt being continuously mixed during the course of reaction with a substance capable of combining with water formed in the reaction and continuously removing the same from the reaction mixture as the reaction proceeds, said water reactive substance being selected from the group consisting of acid forming anhydrides and anhydrous inorganic salts capable of reacting with and absorbing water by forming crystalline hydrated salts containing water as water of crystallization.

4. The process as defined in claim 3, wherein the anhydride reactable with water is $SO_2$ gas.

5. The process as defined in claim 3, wherein the anhydrous substance comprises anhydrous sodium sulfate.

6. The process as defined in claim 3, wherein the anhydrous substance comprises calcined gypsum.

JOHAN WALDEMAR SEVÓN.
FREY VIKING SUNDMAN.

REFERENCES CITED

The following references are of record in the file of this patent:

UNITED STATES PATENTS

| Number | Name | Date |
| --- | --- | --- |
| 2,344,346 | Evans | Mar. 14, 1944 |
| 2,409,862 | Hutchinson | Oct. 22, 1946 |
| 2,462,194 | Hutchinson | Feb. 22, 1949 |
| 2,481,241 | Rapson et al. | Sept. 6, 1949 |